US 7,404,085 B2

(12) United States Patent
Lacasse et al.

(10) Patent No.: US 7,404,085 B2
(45) Date of Patent: Jul. 22, 2008

(54) AUTHENTICATION OF HANDHELD DEVICES FOR ACCESS TO APPLICATIONS

(75) Inventors: Martin Lacasse, Montreal (CA); Jean-Francois Leblay, Montreal (CA)

(73) Assignee: SAP AG, Walldorf (DE)

(*) Notice: Subject to any disclaimer, the term of this patent is extended or adjusted under 35 U.S.C. 154(b) by 614 days.

(21) Appl. No.: 10/934,685

(22) Filed: Sep. 3, 2004

(65) Prior Publication Data

US 2006/0053480 A1 Mar. 9, 2006

(51) Int. Cl.
*H04L 9/00* (2006.01)
(52) U.S. Cl. .................. 713/185; 713/159; 705/18; 705/67; 726/4; 726/9
(58) Field of Classification Search ................ 382/115, 382/116; 705/18, 67; 713/186, 159, 185; 235/382; 726/4, 9
See application file for complete search history.

(56) References Cited

U.S. PATENT DOCUMENTS

| 6,336,142 | B1 | 1/2002 | Kato et al. ............... 709/227 |
| 6,437,836 | B1 | 8/2002 | Huang et al. ............. 348/734 |
| 7,047,419 | B2* | 5/2006 | Black ...................... 713/186 |
| 2002/0095477 | A1* | 7/2002 | Hirata et al. ............. 709/217 |
| 2003/0051041 | A1 | 3/2003 | Kalavade et al. |
| 2003/0061503 | A1 | 3/2003 | Katz et al. |
| 2005/0122209 | A1* | 6/2005 | Black ...................... 340/5.52 |

FOREIGN PATENT DOCUMENTS

EP 1107089 A 6/2001

OTHER PUBLICATIONS

European Search report for EP 05019122.0.
"MySAP Customer Relationship Management" The Best-Run Businesses Run SAP, © 2003 by SAP AG.
"RIM 857 Wireless Handheld and RIM 957 Wireless Handheld" Copyright © 2004 Research In Motion Limited.
"SAP Labs Israel, Projects—CRM Mobile Sales for Handhelds" The Best-Run Businesses Run SAP, http://www.SAP.com>Company>SAP Labs>SAP Labs Israel>Projects>CRM Mobile Sales for Handhelds.
"SAP and RIM to Deliver New Mobile CRM Applications for BlackBerry® Users Worldwide" The Best-Run Businesses Run SAP, http://www.SAP.com>Solutions>mySAP CRM>News & Events>Press Release—May 12, 2004, Copyright © 2004 SAP AG.

* cited by examiner

*Primary Examiner*—Emmanuel L Moise
*Assistant Examiner*—Paul Callahan
(74) *Attorney, Agent, or Firm*—Kenyon & Kenyon LLP

(57) ABSTRACT

The present invention provides a method and system for communicating via a handheld device to Internet applications such as customer relationship management applications. Automatically generated user information, such as an electronic mail (e-mail) address, containing a certification key is used to authenticate a mobile user's access to Internet applications. Access from mobile devices, such as personal data assistants, is possible because no password is required to log in. Other security measures may be used in conjunction with providing user information to ensure access only to authorized users.

20 Claims, 5 Drawing Sheets

AUTHENTICATION OF HANDHELD DEVICES FOR ACCESS TO APPLICATIONS

BACKGROUND

Information and computer technology comprises an essential component for modern business operations. The utility of computer technology has been enhanced by the coupling of computers with information networks such as the Internet and World Wide Web ("WWW"). Successful business operations in the global marketplace require a synergetic relationship between local and distributed operations. For example, localized operations may include research and development, inventory management, customer service, strategic planning, etc. Distributed operations are conducted, for example, by sales personnel in the field who interact with customers and perform such tasks as order generation, customer relations, customer support, etc. Field personnel use mobile devices such as laptop computers for customer information, intake of customer orders, communication with one or more centralized databases at the home office, etc. Field personnel demand accurate and timely information regarding the state of business operation in order to effectively perform their jobs. For example, sales personnel typically require up to the minute information regarding current inventory levels, product availability and customer data. Conversely, the enterprise can operate more effectively through centralized management of information regarding the operations of field personnel and information collected in the field.

DETAILED DESCRIPTION

The present invention provides a method and system for communicating via a handheld device to Internet applications such as customer relationship management applications. Automatically generated user information, such as an electronic mail (e-mail) address, containing a certification key is used to authenticate a mobile user's access to Internet applications. Access from mobile devices, such as personal data assistants, is possible because no password is required to log in. Other security measures may be used in conjunction with providing user information to ensure access only to authorized users.

Figure 1:
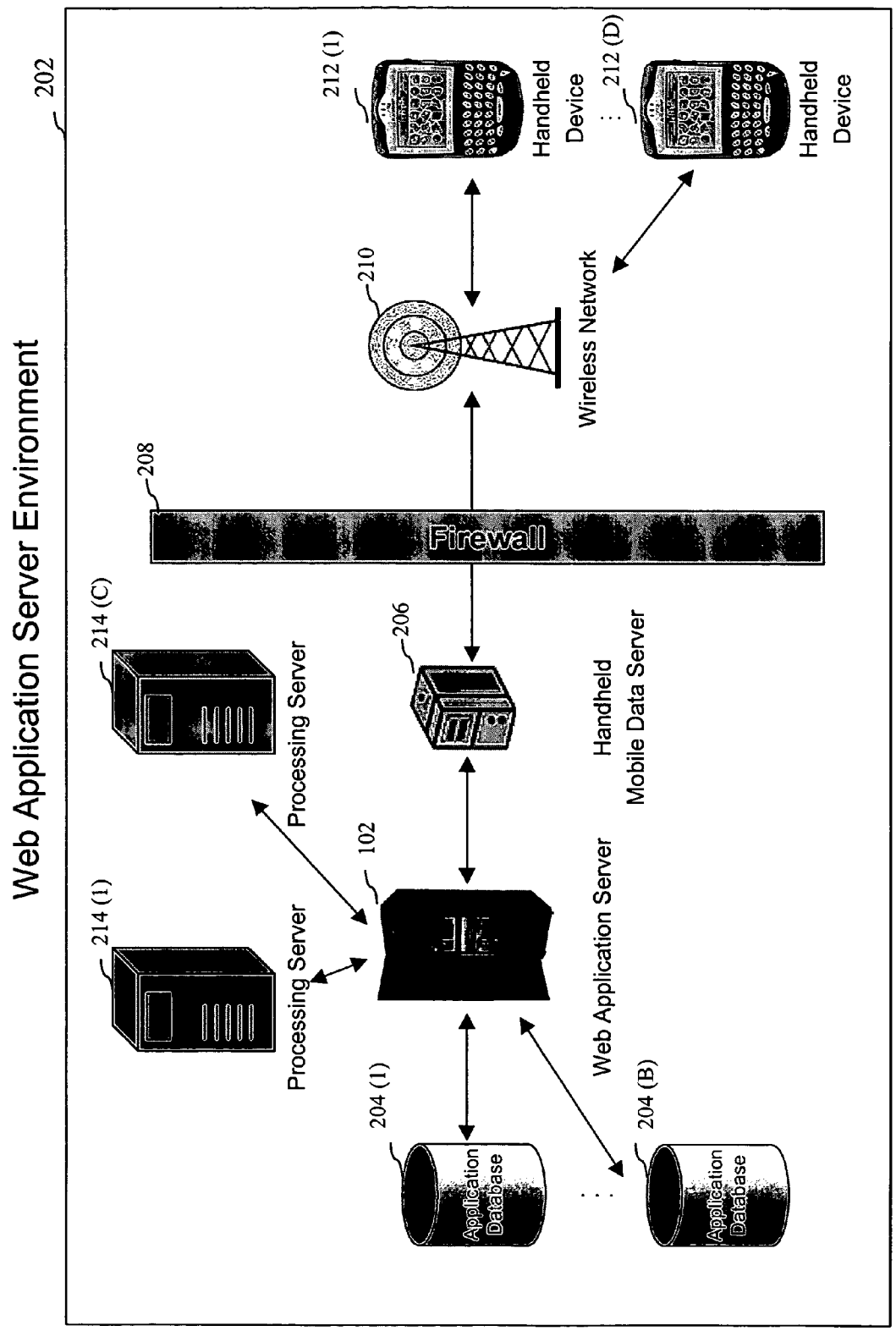
FIG. 1 depicts a web application server environment according to one embodiment of the invention.

FIG. 1 depicts web application server environment 202 according to one embodiment of the invention. Web application server environment 202 includes web application server 102, application databases 204 (1)-204 (B), handheld mobile data server 206, firewall 208, wireless network 210, handheld device 212, and processing servers 214 (1)-214 (C).

Web application server 102 is connected to application databases 204 (1)-204 (B) to fetch and store data. Each application database 204 is a set of related data or files that make up software for a specific application, such as customer relationship management. Application database 204 can manage any form of data including text, images, sound and video. Web application server 102 runs processes related to a business application that operates on data resident in web application databases 204 (1)-204 (B) such as online applications relating to customer management. Online applications include applications that are available for immediate use, such as Internet applications or applications available via other remote services. Note that web application server 102 also communicates with processing servers 214 (1)-214 (C), which may perform additional processing.

Additionally, web application server 102 is connected to handheld devices 212 (1)-212 (D) via handheld data server 206, firewall 208 and wireless network 210 to provide users of handheld devices 212 (1)-212 (D) with access to applications and other services available via Web Application Server 102. To access these services, handheld device 212 must log onto Web Application Server 102. Web Application Server 102 will perform an authentication process to allow access. However, no password will be required for the authentication process. Users simply need to send, for example, an e-mail message, to obtain access. This will be described further with respect to FIGS. 2-4.

Handheld data server 206 is a processor system shared by handheld devices 212 (1)-212 (D) for the purpose of facilitating access to web application server 102. In an embodiment of the invention, the handheld data server 206 is a Blackberry RIM Mobile Data Service. For extra security for mobile authentication, handheld data server 206 and web application server 102 may communicate via a trusted connection. A trusted connection may use a security protocol that encrypts and decrypts a message for online transmission. The security protocol may also provide some authentication. An exemplary security protocol is Netscape's Secure Sockets Layer (SSL), which involves a server transmitting a public key to a browser at the start of a session for use in generating a secret key that is sent back to the server. Other security protocols are available including protocols provided by Microsoft and the Internet Engineering Task Force (IETF). A HyperText Transport Protocol Secure (HTTPS) port may be used in conjunction with the SSL protocol to provide access to a secure Web server.

Firewall 208 is a computer that acts as an interface between the wireless network 210 and the web application server 102 to regulate data transmissions for the purpose of protecting web application server 102 from electronic attacks originating from wireless network 210. In alternate embodiments of the invention, web application server environment 202 does not comprise firewall 208. In those embodiments web application server 102 is connected directly to wireless network 210. In embodiments of the invention, firewall 208 may be constructed using one of a number of known firewall software applications running in a server. In alternate embodiments of the invention, firewall 208 may include a software application running on a server with other applications including applications carrying out some or all of the functionality described with respect to FIG. 2.

Wireless network 210 is any arrangement of elements that use electromagnetic waves such as radio, cellular, infrared, or satellite transmission and may include any type of public or private wireless network.

Handheld devices 212 (1)-212 (A) may be any portable computer, which may be designed to act as an organizer, note taker and/or communication device. These devices may have a small physical size and may possess compact user interfaces such as touch screens, hand writing recognition, or miniature keyboards. According to an embodiment of the invention, handheld devices 210 (1)-210 (A) are personal data assistants such as those manufactured by Sony, Hewlett-Packard, and Blackberry, e.g., Blackberry RIM.

Figure 2:
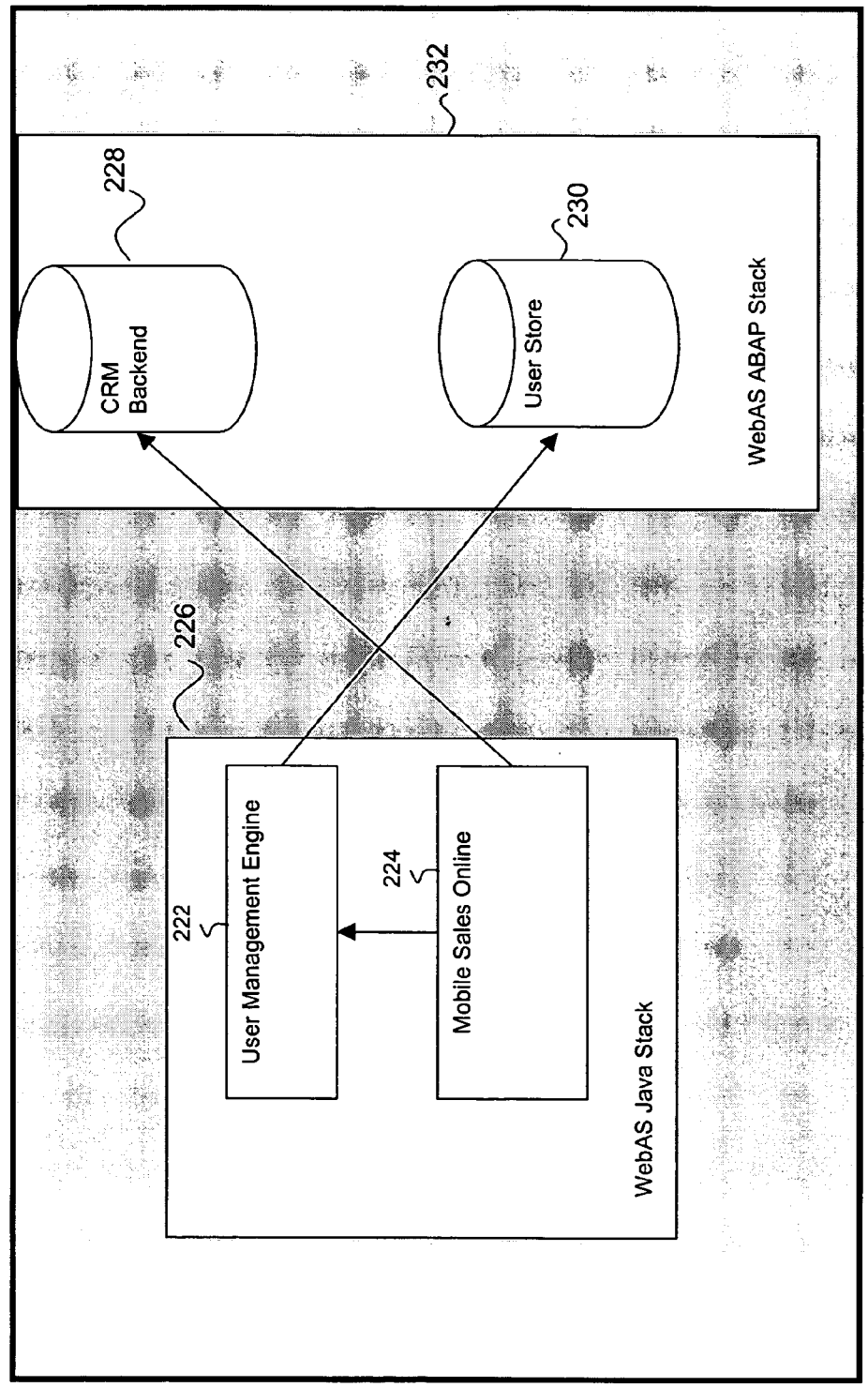
FIG. 2 shows an authentication environment according to one embodiment of the invention.

FIG. 2 shows authentication environment 218 according to one embodiment of the invention. Authentication environment 218 comprises user management engine 222, mobile sales online engine 224, CRM Backend 228, and user store 230 for providing authentication for mobile users wishing access to services provided via CRM Backend 228. Authentication environment 218 may run on Web Application Server 102.

In an embodiment of the invention, user management engine 222 and mobile sales online engine 224 may be implemented in Java Stack 226, and CRM Backend 228 and user store 230 may be implemented in ABAP stack. Java Stack 226 may be implemented as a Java 2 Platform, Enterprise Edition (J2EE) service. J2EE defines a standard for developing component-based multitier enterprise applications to support Web services and provide development tools. ABAP Stack may be implemented using ABAP, which is an object-oriented programming language designed by SAP to provided optimized select functionality from databases. The ABAP programming language is described further in, for example, H. Keller et al., ABAP Objects: The Official Release. In an alternate embodiment of the invention, no Java Stack and/or ABAP Stack are used. User management engine 222, mobile sales online engine 224, CRM backend 228 and user store 230 may be implemented in any implemented in any combination of any high-level procedural, object-oriented and/or assembly machine language.

User management engine 222 may provide user authentication service at the request of mobile sales online engine 224. To provide user authentication service, user management engine 222 receives user information and accesses user store 230 to verify that the user is authorized access to Web Application Server 102. This user information may be automatically generated by a handheld device 212 so that the user is not required to specifically enter authentication information. For example, an e-mail address sent in an e-mail is information that is automatically generated by a user and is not specific to requesting authentication. No software modifications are needed to handheld devices 212 (1)-212 (D) to access services via the Internet and users may access the Internet services using equipment made by various manufacturers and various models of this equipment. Mobile sales online engine 224 may retrieve the user's e-mail address and send this information to user management engine 222. Upon receipt, user management engine 222 can retrieve a certification, which is a key, such as a user identifier and query user store 230 to determine if the user is authorized access. A check to determine if a user is authorized access may entail verifying that the user identifier is stored in user store 220 and the user's e-mail address is valid. User store 230 is any machine-readable medium used to store data that stores registered users. In an alternate embodiment of the invention, a personal identification number (PIN) of handheld device 212 is also checked as an added level of security. User management engine 222 can verify that the PIN of the handheld device 212 matches a PIN of a handheld device registered to the user identified by the e-mail address. A handheld telephone number may also be used for this purpose when, for example, handheld device 212 is a cellular telephone. In an additional alternate embodiment of the invention, the PIN and/or the telephone number are checked but not the e-mail address.

Mobile sales online engine 224 may be used to provide sales software online to mobile users. Mobile sales online engine 224 may be implemented as a software component using Web Dynpro development components (DCs). Mobile sales online engine 224 may provide account management, sales contract management, sales order management, as well as other customer account and sales software functionality. Mobile sales online engine 224 provides this sales software by accessing customer relationship management backend 228, which may reside one or more of application databases 204 (1)-204 (B). Mobile sales online engine 224 may be designed to interface with a handheld device so that users in the field can access the data online.

Figure 3:
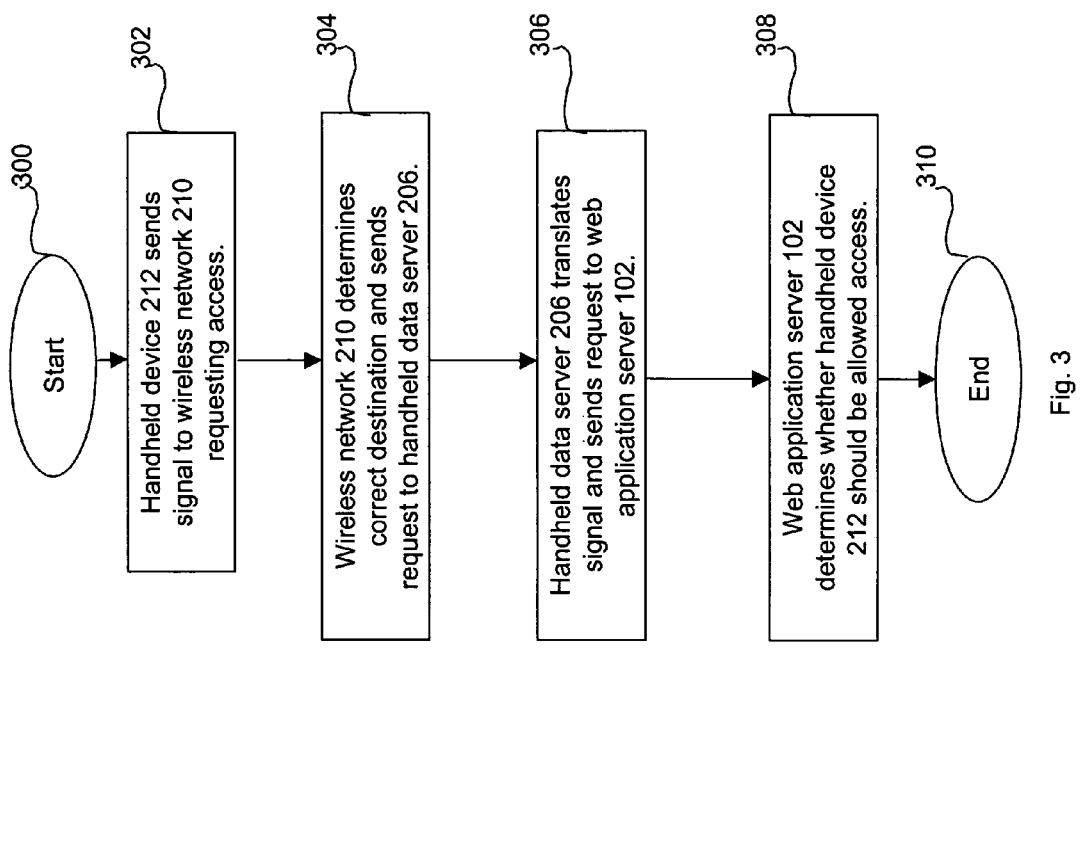
FIG. 3 shows the flow of processing performed to allow a handheld device to access a web application server according to one embodiment of the invention.

FIG. 3 shows the flow of processing performed by handheld device acceptor residing in the web application server environment 202 to allow a handheld device 212 to access web application server 102. In step 302, handheld device 212 sends a signal to wireless network 210 requesting access to web application server 102. This signal may be in the form of an electronic mail message (e-mail). In step 304, wireless network 210 identifies the correct destination for the request and sends the request to handheld data server 206.

In step 306, handheld data server 206 translates the signal so that it can be processed by web application server 102. Handheld data server 206 may convert an incoming e-mail request to a HyperText Transport Protocol (HTTP) format. HTTP is a communications protocol that is used to connect to servers on the Web. Handheld data server 206 may add the user's e-mail address to the HTTP header. Then handheld data server 206 sends the request to web application server 102.

In step 308, web application server 102 determines whether to allow access to handheld device 212. Step 308 is illustrated in more detail with respect to FIG. 4.

Figure 4:
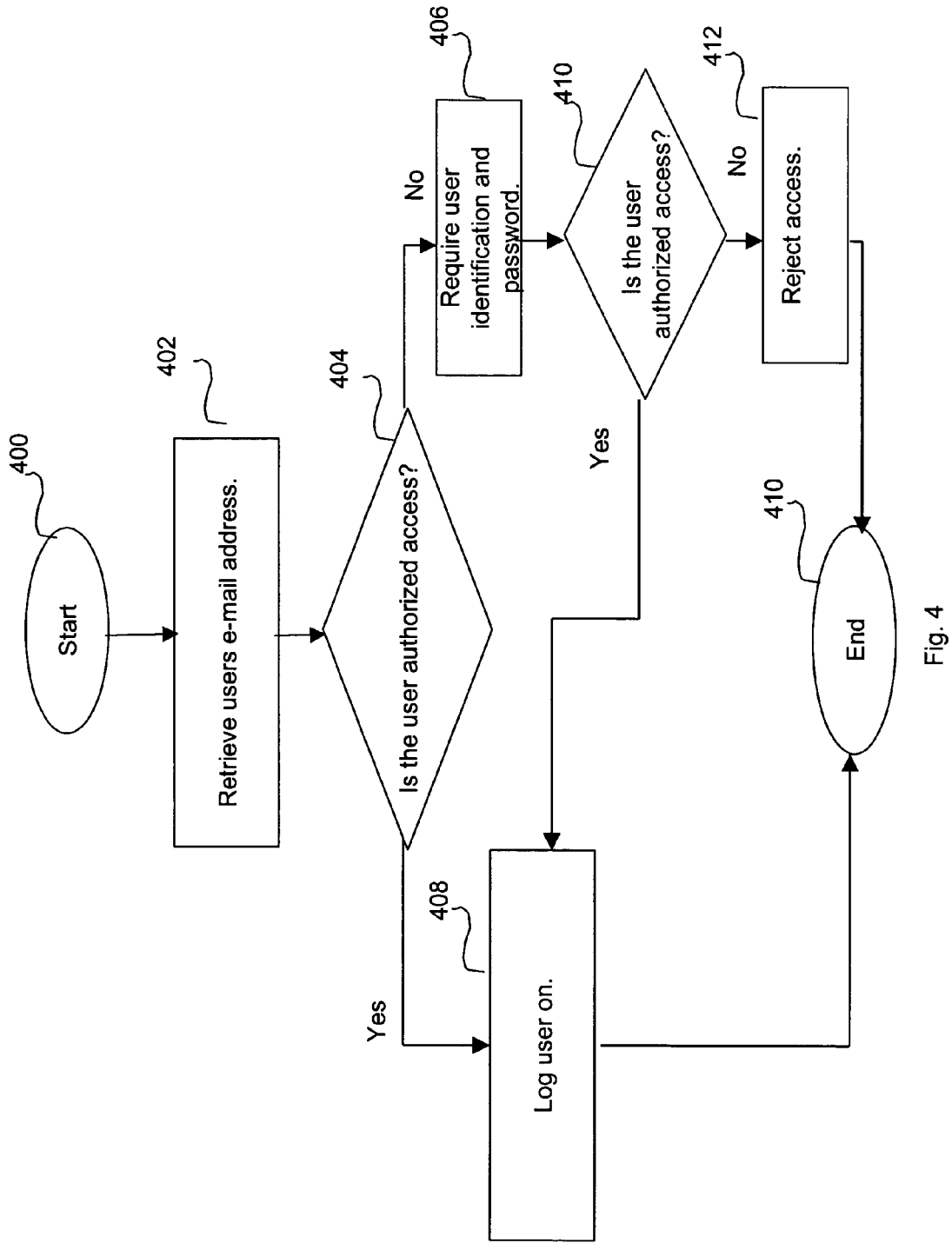
FIG. 4 shows the flow of processing to determine whether to allow a handheld device access according to one embodiment of the invention.

FIG. 4 shows the flow of processing to authenticate access by a handheld device performed by web application server 102. Instructions for authenticating access may be implemented in any code and/or computer software. For example, these instructions may by implemented according to the Java Authentication and Authorization Service (JAAS), which is a set of Application Programmer Interfaces (APIs) that enable services to authenticate and enforce access controls upon users. An API may be a language and message format used by an application program to communicate with an operating system or some other control program such as a database management system (DBMS) or communications protocol. The instructions for authentication may be implemented such that they are not specifically related to the mobile sales online software and can be used to access any application software residing on the web.

An initial check may be performed to determine if the user has already logged into the system. To do this, the web application server 102 may determine whether a ticket is already available in the session. J2EE server 226 may be used to issue and receive tickets that are used to track whether a user has already logged into the system. J2EE server 226 may issue a ticket by creating a ticket and assigning it to a user session. Once a ticket is assigned to a user session, other connections can use the ticket. Therefore, if a ticket is associated with a user's session, the user may access the mobile software online without further login.

To proceed with login, in step 402, web application server 102 receives an incoming message, such as an e-mail, and parses the message to retrieve a certification, which may be, for example, a user identifier from the e-mail address of the user that sent the e-mail. A sender's e-mail address may be retrieved from the HTTP header of the e-mail.

In step 404, web application server 102 determines whether the user is authorized access. Upon receipt of the incoming message, user management engine 222 can determine if the user is authorized access using the certification or user identifier that was retrieved. A check to determine if a user is authorized access may entail verifying that the user identifier is stored in user store 220 and that the user's e-mail address is valid. User store 230 may be any machine-readable medium that stores registered users. In an alternate embodiment of the invention, a personal identification number (PIN) of handheld device 212 is also checked as an added level of security. User management engine 222 may verify that the PIN of the handheld device 212 matches a PIN of a handheld device registered to the user identified by the e-mail address. A handheld telephone number may also be used for this purpose when, for example, handheld device 212 is a cellular telephone. In an additional alternate embodiment of the invention, a PIN and/or the telephone number are checked without a check of an e-mail address. Web application server 102 may send a query to user management engine 222 for this determination. User management engine 222 may store e-mail addresses that have been assigned to users that are allowed access to mobile online software 224.

As can be seen from step 406, if the user is not authorized, user identification and a password are required. The user is prompted for a user identification and a password. In step 410, web application server 102 determines whether the user is authorized access by verifying that the user identification is that of an authorized user and verifying that the user has entered the correct password. If the user is authorized access, processing proceeds to step 408. If the user is not authorized access, processing proceeds to step 412 and the user is rejected access.

If the user had been authorized, processing continues to step 408. In step 408, web application server 102 logs the user on. When the user is logged on, a ticket may be created so that the user does not login again to establish another connection. The user management engine 222 may generate a ticket and set a timer. After a certain period of time, for example, eight hours, the ticket may expire requiring the user to log on again. The amount of time that a ticket remains active i.e., does not expire, may be configured by an administrator.

Figure 5:
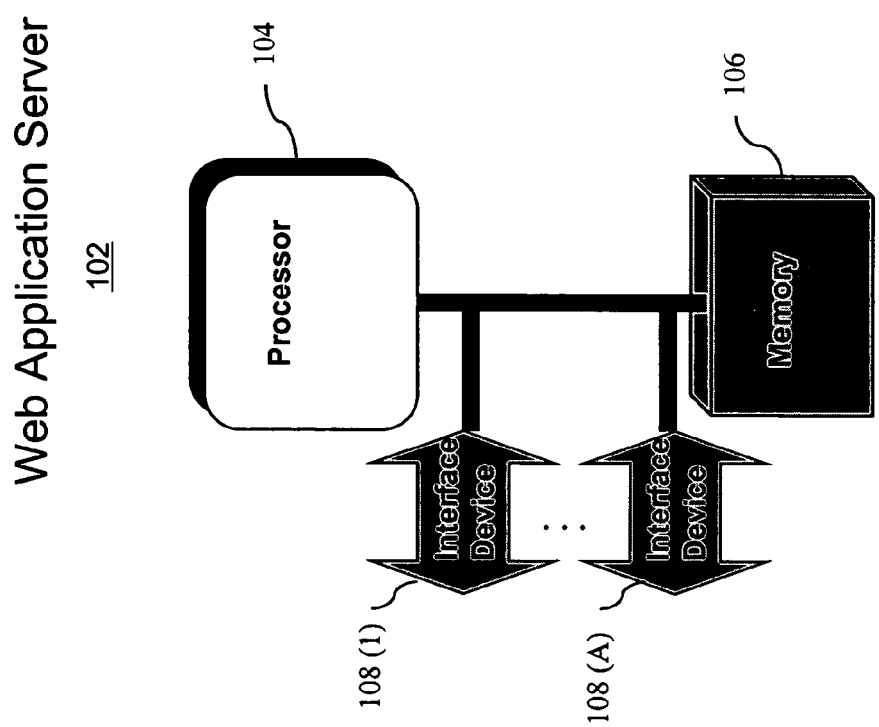
FIG. 5 shows a structure of a web application server according to one embodiment of the invention.

FIG. 5 depicts a web application server 102 according to one embodiment of the invention. Web application server 102 includes processor 104, memory 106, and interface devices 108 (1)-108 (A). Processor 104 is connected to memory 106. Processor 104 is also connected to interface devices 108 (1)-108 (A). These connections are direct or via other internal electronic circuitry or components.

Processor 104 is a programmable processor that executes instructions residing in memory 106 to receive and send data via interface devices 108 (1)-108 (A). The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention processor 104 is an Intel microprocessor.

Memory 106 is a machine-readable medium that stores data that is processed by processor 104. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, or any combination of these devices). This may include external machine-readable mediums that are connected to processor 104 via one or more interface devices 108 (1)-108 (A).

Interface devices 108 (1)-108 (A) are interfaces that receive and/or send digital data to and from an external device. Interfaces as used herein are any point of access to an external device where digital data is received or sent, including ports, buffers, queues, subsets thereof, or any other interface to an external device.

Various implementations of the systems and techniques described here can be realized in any processing systems and/or digital electronic circuitry, integrated circuitry, specially designed ASICs (application specific integrated circuits), computer hardware, firmware, software, and/or combinations thereof. There various implementations can include computer code.

A number of embodiments of the invention have been described. Nevertheless, it will be understood that various modifications may be made.

What is claimed is:

1. A system for authenticating access comprising:
a processor;
a memory coupled to said processor; and
an authentication environment residing in said first memory and executed by said first processor, said authentication environment comprising:
an application, responsive to an electronic communication from a mobile device, to retrieve addressing information therefrom identifying an origin address of the communication;
a user management engine adapted to:
retrieve a certification from storage using said origin address,
determine from said certification whether a user of the mobile device is authorized access, and
generate a ticket that will allow a user to remain logged on for a period of time set by an administrator; and
a user store to process a query received from said user management engine and retrieve data stored that can be used to identify authorized users.

2. The system of claim 1, further comprising a wireless network that is coupled to said processor and to one or more mobile devices.

3. The system of claim 1, further comprising a mobile data server coupled to said processor via a secured connection to convert signals to and from an information network communications protocol.

4. The system of claim 3, further comprising:
a wireless network coupled to said mobile data server to transmit signals to and from said mobile data server; and
one or more mobile devices coupled to said wireless network to attempt to access said processor.

5. The system of claim 4, further comprising:
a firewall connected to said wireless network and to said mobile data server to protect said processor from electronic attacks.

6. The system of claim 1, further comprising an application database storing a customer relationship management application.

7. The system of claim 1, wherein the communication is an electronic mail message and said origin address is a user electronic mail address.

8. The system of claim 7, wherein said communication further includes a personal identification number associated with said mobile device, which is compared against a corresponding personal identification number stored by said authentication environment.

9. The system of claim 7, wherein said communication further includes a telephone number associated with said mobile device, which is compared against a corresponding telephone number stored by said authentication environment.

10. A method for authenticating access, comprising:
   parsing an electronic communication received from a handheld device and retrieving addressing data therefrom identifying an address of origin of the communication;
   retrieving a certificate from storage based on the address of origin to determine whether a user of the handheld device is authorized access;
   processing a query received from and retrieving data stored that identifies authorized users;
   authenticating access if said user is authorized; and
   generating a ticket that will allow a user to remain logged on for a period of time set by an administrator.

11. The method of claim 10, wherein said electronic communication comprises a user electronic mail address.

12. The method of claim 10, wherein said electronic communication comprises a user electronic mail address and a personal identification number associated with said handheld device.

13. The method of claim 10, wherein said electronic communication comprises a personal identification number or a telephone number.

14. The method of claim 10, further comprising logging said user onto an Internet application.

15. The system of claim 1, wherein the authentication environment operates without a password challenge posed directly to a user of the mobile device.

16. A computer readable medium storing thereon program instructions that, when executed, cause an executing device to:
   parse an electronic communication received from a handheld device and retrieving addressing data therefrom identifying an address of origin of the communication;
   retrieve a certificate from storage based on the address of origin said addressing data to determine whether a user of the handheld device is authorized access;
   process a query received from and retrieving data stored about authorized users; and
   generate a ticket that will allow a user to remain logged on for a period of time set by an administrator.

17. The computer readable medium according to claim 16 further comprising instructions that cause the executing device to log said user onto an Internet application.

18. The computer readable medium according to claim 16 wherein said electronic communication comprises a user electronic mail address.

19. The computer readable medium according to claim 16 wherein said electronic communication comprises a user electronic mail address and a personal identification number associated with said handheld device.

20. The computer readable medium according to claim 16 wherein said electronic communication comprises a personal identification number or a telephone number.

* * * * *